May 16, 1939.  E. W. SMITH ET AL  2,158,839

DRY GAS METER

Filed Sept. 25, 1936  2 Sheets-Sheet 1

Inventors
E. W. Smith
A. Charles
R. W. E. Gaskin
by
W. E. Evans
Attorney.

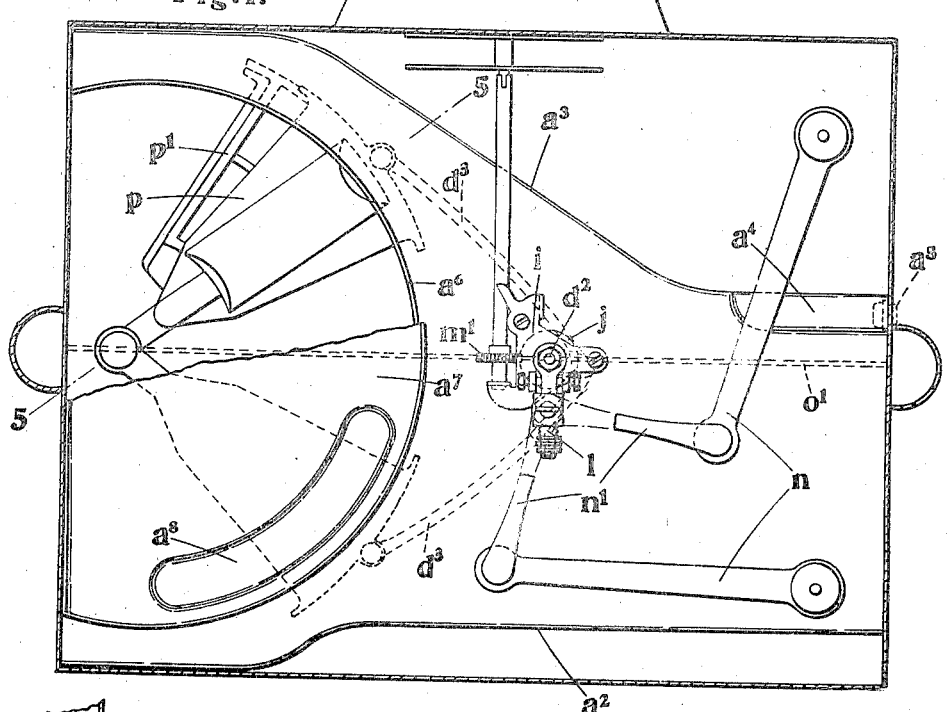
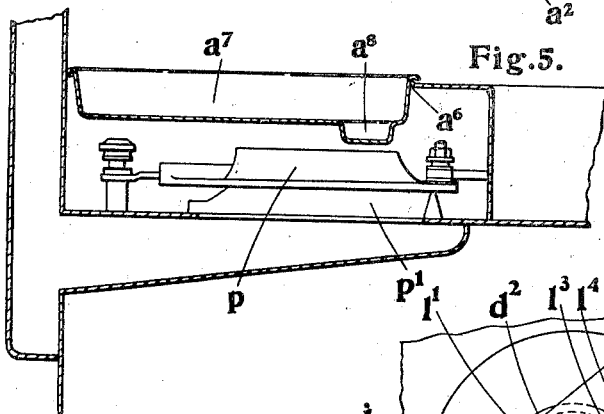
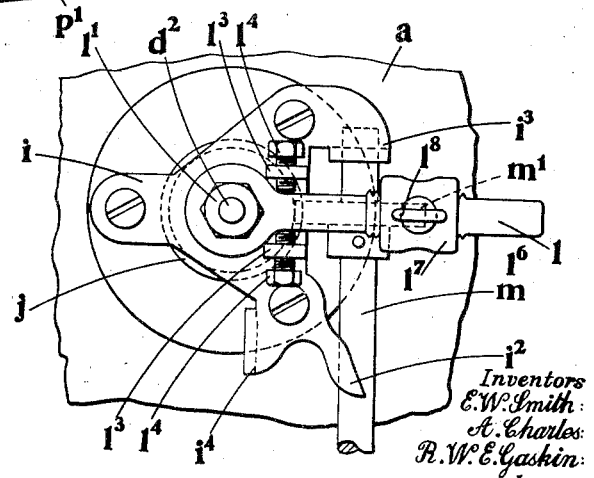

UNITED STATES PATENT OFFICE 2,158,839

DRY GAS METER

Ernest William Smith, London, Arthur Charles, Streatham Vale, London, and Richard Walter Ernest Gaskin, Claygate, England Application September 25, 1936, Serial No. 102,494 In Great Britain September 27, 1935

3 Claims. (Cl. 73—268)

This invention relates to dry gas meters, more especially of the type known as "closed top" meters in which above the valve plate there is provided a closure plate by which the gas is excluded from the upper compartment of the meter in which it is usual to dispose the index mechanism and which may therefore be exposed to normal atmospheric air pressure. In such meters the valves, crank and crank arms are contained within the space that is enclosed within the valve plate and the closure plate and is subjected to the gas under pressure, and in order that the rotating movement imparted by the diaphragms to the flag wires may be transmitted to the crank, the spindle of the crank is required to pass through the closure plate by way of a gland or stuffing box. Difficulty has, however, been occasioned in securing an effective gas-tight joint by reason of the fact that the space which is available for the provision of an effective gland or stuffing box is confined. Further, in such meters it is the usual practice in the mounting of the tangent arm upon the crank shaft to secure the tangent arm by means of solder. Such method of mounting has the disadvantage that heat applied to the crank shaft may cause the soldering fluid to tend to travel downwardly to the bearings of the crank shaft, thus causing corrosion, while also the stuffing gland and the packing therein are prejudicially affected both by the heat and by the soldering fluid. Further difficulty has, moreover, been experienced in that it is usual for the spindle of the crank to be supported in the gland or stuffing box by means of a bracket soldered to the closure plate of the meter casing and serving to support the upper end of the spindle against the reaction of the tangent arm. In the making of the soldered joint it has frequently been found that the heat prejudicially affects the stuffing within the stuffing box. Further, the closure plate is usually formed of a plurality of separate stampings which require to be soldered or otherwise secured together. This construction is disadvantageous for the reason that it is not possible entirely to avoid the risk of leakage through the numerous soldered or other joints which require to be formed, while the necessity for forming a plurality of stampings with attendant joints increases the cost of the meter and the numerous joints set up eddies of gas creating added back pressure.

The invention has among its objects to overcome the disadvantages of the usual construction of dry gas meter as hereinbefore described and to provide a form of compound gland or stuffing box by which an effective gas-tight joint may be secured and the possibility of the escape of gas above the closure plate avoided, and to provide means for the support of the spindle of the crank such that the parts may be assembled in the required position without the use of heat, and generally to improve the construction of the mechanism of gas meters.

The invention consists in providing a stuffing box through which the spindle of the crank may pass through the closure plate for connection to the crank and in supporting the said spindle in a bracket or like bearing member of such construction in one or a number of parts that the said bracket or bearing member may be applied in position without the use of heat.

The invention further consists in providing a stuffing box through which the spindle of the crank may pass and in enclosing the said gland or stuffing box within a concentric enclosure which also is packed with grease or suitable packing material.

The invention further consists in providing the bracket or bearing member with a plurality of pillars or standards, for example, three, by which the bracket or bearing member may be secured to the surface of the closure plate or to the stuffing box or gland by such means as screws.

According to the invention, moreover, the closure plate may be provided with a removable cover of suitable outline adapted to be fitted above the valves upon the valve plate in such manner that access may readily be secured to the valves without the necessity for the dismantling of the sheet metal fitting before referred to. Such cover plate may be dished downwardly or inwardly towards the valve plate and may be provided with local depressions which are adapted to be positioned immediately above the respective valves to prevent the valves from rising and locking during transit of the meter.

The invention further comprises the features of construction hereinafter described.

The invention is illustrated, by way of example, in the accompanying drawings.

Figure 3 is a fragmentary plan view of the mechanism represented in Figure 1, to an enlarged scale.

Figure 4 is a plan view, partly in section, to a smaller scale, of the upper part of a meter provided according to the invention.

Figure 5 is a detail cross-section on the line 5—5 of Figure 4.

Figures 1, 2:
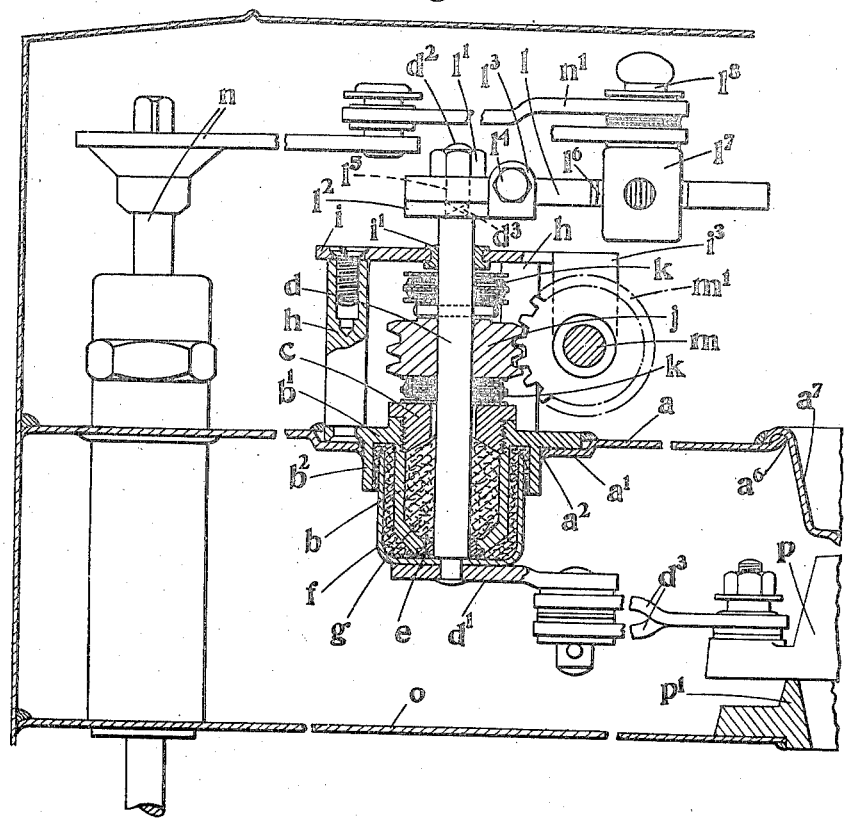
Figure 1 is a sectional elevation through a gland or stuffing box according to the invention, with the co-operating parts.
Figure 2 is a sectional elevation, to an enlarged scale, of a modified construction of the gland or stuffing box.

In carrying the invention into effect according to the construction represented in Figure 1 of the accompanying drawings, the closure plate $a$ is formed with a circular seating $a^1$ by stamping such that a circular aperture $a^2$ is bounded by a recessed portion of the plate. Within the seating $a^1$ thus formed there is mounted, as by soldering, the stuffing box comprising the body $b$ having a peripheral flange $b^1$ adapted to seat upon the seating $a^1$ of the closure plate $a$. At a suitable distance from the wall of the stuffing box body $b$ which projects downwardly from the peripheral flange $b^1$ there is provided a concentric wall $b^2$ of small depth forming a skirting surrounding the stuffing box. The stuffing box is closed at the upper end by a gland $c$ surrounding the crank spindle $d$, which spindle also passes through the bottom of the stuffing box through a bearing ring $e$, and at the lower end has fitted to it the crank arm $d^1$. An enclosure in the form of a sheet metal cup $f$ is provided to be supported upon the crank arm $d^1$ and is of a size to surround the stuffing box body $b$ and to leave an annular space between the inner face of the cup and the outer face of the wall of the stuffing box body. The cup $f$ is further adapted to extend with the upper edge into the annular space formed between the skirting $b^2$ and the wall of the stuffing box body. The stuffing box body is packed at $g$ with suitable material such as grease, tallow or waxed packing material, and the annular space around the stuffing box body within the cup $f$ is also packed with grease or suitable packing material.

Where it is desired to impart to the grease or packing within the cup a compressing action, the cup $f$ may, as illustrated in Figure 2, be formed with a screw-threaded wall so that the inner surface presents a screw-thread $f^1$ which in the rotation of the crank, together with the cup, tends to carry the grease or packing material downwardly in relation to the stuffing box body and thus more effectively to pack the joint between the stuffing box and the spindle. In such a construction the exterior surface of the stuffing box body $b$ may also be provided with grooves $b^3$ or a thread suitably formed to assist in the compressing action.

The peripheral flange $b^1$ of the stuffing box serves to support, as by riveting, on the upper face a number, advantageously three, of standards or pillars $h$ (Figure 1) by which a bearing plate $i$ for the crank spindle $d$ may be carried, being secured at the head of the standards or pillars, for example, by means of screws. Such bearing plate is bushed, as at $i^1$, to receive the spindle $d$ bearing the worm $j$ by which the drive of the index mechanism is effected, the space between the bearing plate $i$ and the flange $b^1$ of the stuffing box being sufficient to admit the worm $j$ together with ball bearings $k$ disposed above and below the worm to absorb the thrust resulting from the drive. The tangent arm $l$ is fitted upon the upper end of the spindle $d$ above the bearing plate $i$. The bearing plate $i$ may advantageously be formed or provided with a stop finger $i^2$, for engagement with a non-return pawl (not shown) mounted on the tangent arm, and other accessory parts which co-operate with the tangent arm and with a bearing lug or lugs, such as $i^3$, $i^4$, for example, for the index driving spindle $m$ carrying the worm wheel $m^1$ that is driven by the worm $j$ or for the metering spindle by which the quantity mechanism of prepayment meters is returned to the zero setting.

By such means it will be appreciated that when the body $b$ of the stuffing box has been positioned upon the closure plate and the spindle of the crank $d$ assembled within the gland or stuffing box together with the ball bearings $k$ and the worm $j$, the bracket or bearing plate $i$ is readily secured in position upon the pillars $h$ without the use of solder or heating.

In the preferred construction of the tangent arm $l$ according to the invention, which, however, is described merely by way of example, the upper portion $d^2$ of the crank spindle $d$ is provided of reduced diameter and at the lower end of the portion of small diameter the spindle is formed, at $d^3$, of a squared or other non-circular cross-section, while the upper part of the portion of small diameter is screw-threaded for the reception of a nut $l^1$.

A bracket or arm $l^2$ provided with a squared or other non-circular hole is mounted upon the squared or non-circular part $d^2$ of the crank spindle, the said bracket being provided to extend radially from the axis of the crank spindle and to be formed at the outer end with laterally disposed and spaced lugs or ears $l^3$ upwardly extending and bored and screw-threaded for the reception of oppositely disposed adjusting screws $l^4$ that have their coincident axes set transversely to the longitudinal axis of the bracket.

The tangent arm $l$ is provided with an eye or boring $l^5$ at the axial end adapted to be received upon the lower part of the portion $d^2$ of the crank spindle of small diameter in such manner that it is rotatable thereon. The form of the tangent arm $l$ or of the bracket $l^2$ is such that when the tangent arm is in position it comes to lie between the lugs or ears $l^3$ of the bracket $l^2$ so that the adjusting screws $l^4$ are disposed one upon each side of the lateral faces of the tangent arm $l$ and may be adjusted relatively thereto for the purpose of securing the required angular disposition of the tangent arm with respect to the crank spindle. The tangent arm is then locked to the crank spindle by the application of the nut $l^1$ or nuts to the screw-threaded upper part of the portion of small diameter of the crank spindle.

The tangent arm may be provided along its length with a screw-threaded portion $l^6$ upon which is received the adjustable nut $l^7$ by which connection is made through the links $n^1$ with the flag wires $n$. The nut $l^7$ may be conveniently locked in the desired position by means of a screwed clamping pin $l^8$ adapted to engage either the upper or lower face of the tangent arm which for the purpose is provided with a flattened surface by the cutting away of the screw thread. The pin $l^8$ further serves for the purpose of the connection of the links $n^1$ to the nut $l^7$, the ends of the links being journaled upon the pin $l^8$ with intervening washers, before the pin is used to clamp the nut $l^7$. The outer end of the pin $l^8$ is conveniently flattened to form a grip and to confine the ends of the links.

In the particular construction of closed top meter illustrated in the accompanying drawings, the valve plate $o$ is adapted to receive valve gratings $p^1$, for example, of the arc type which are set in suitable relation to the pivotal axis of the valves $p$ that are adapted to oscillate about the said pivotal axis and that are operated by the crank arm $d^1$ through connecting rods $d^3$ pivotally connected thereto at positions distant from the pivotal axis. The crank spindle $d$ is advantageously positioned upon the longitudinal axis of the meter, that is to say, above the dividing partition $o^1$ between the diaphragm chambers that is provided below the valve plate, while the flag wires $n$ are respectively provided towards the far corners of the valve plate.

The sheet metal fitting, which according to the invention forms the closure plate $a$, is provided to extend upwardly to approximately half the depth of the valve compartment of the meter casing and is formed with the upper surface parallel or substantially so with the valve plate $o$. The lateral walls $a^2$, $a^3$ of the fitting $a$, which are formed when the fitting is stamped, are provided in the one case $a^2$, to extend in close proximity to the front or rear wall of the meter casing in a position substantially parallel with the longitudinal axis of the meter, and so as to enclose within it the adjacent valve grating $p^1$ and the corresponding flag wire $n$. In the other case, $a^3$, the lateral wall of the fitting is adapted to extend in close proximity to the oppositely disposed rear or front wall of the meter casing and then to extend in an angular direction towards the crank shaft bearing and finally to extend to the adjacent side wall of the meter casing at a position somewhat removed from the longitudinal axis of the meter and parallel thereto. In this case it will be noted that the corresponding flag wire $n$ is not enclosed within the fitting. The parallel portion of the wall of the fitting and the upper surface of the fitting at the position last referred to may be depressed or stamped inwardly, as at $a^4$, to form a clearance for the reception in the adjacent side wall of the meter casing of a gland $a^5$ through which may pass a spindle by which movement may be transmitted from the crank shaft to prepayment mechanism or index mechanism contained in an auxiliary casing disposed exterior to the said side wall of the main meter casing.

It will be understood that the side wall of the meter casing is in the usual manner provided with an opening by which communication is effected between the space enclosed by the fitting and the valve plate and the inlet fitting on the exterior of the meter casing or with the valve box in the case of a prepayment meter.

At the position immediately above the valves the upper surface of the fitting is removed so that an opening $a^6$ of a substantially semi-circular form is provided. The said opening is adapted to be closed by a stamped dish-like cover plate $a^7$ which is of a form to seat within the opening with an outwardly beaded edge resting upon the upper surface of the closure plate. The said dish-like cover is provided in positions immediately above the outer curved faces of the valves with local depressions $a^8$ which extend downwardly into proximity with the corresponding valves to prevent the valves from rising and locking in transit of the meter.

The closure plate $a$ may be provided of a form other than that hereinbefore described. Thus, it is not essential that a dished cover should be provided as described. When a cover is used it may take any desired outline. Similarly, the lateral form of the closure plate will be modified according to the disposition of the parts of the meter mechanism that are present above the valve plate. Again, where the disposition of the inlet fitting of the meter is such that it is in close proximity to the longitudinal axis of the meter casing, the closure plate may be provided to exclude the adjacent flag wire.

It will be understood that the invention is not limited to any particular construction of the parts as hereinbefore described and that the invention may be carried into effect by constructions fulfilling the purpose for which the invention is intended.

We claim:

1. A gas meter of the dry type provided with a closed top having a valve plate and a closure plate for the gas-way above the valve plate, a crank spindle and tangent arm, the crank spindle extending through the closure plate and the crank being positioned between the valve plate and the closure plate, a stuffing box with peripheral flange seated upon the closure plate by means of the peripheral flange and serving for the passage of the crank spindle through the closure plate, a concentric enclosure encircling the stuffing box and of dimensions to leave to the exterior of the stuffing box an annular space, the said enclosure being carried by the crank spindle, packing material within the stuffing box and within the said annular space, and a bearing member for the part of the crank spindle adjacent the tangent arm comprising a bearing plate and a number of pillars, the said pillars being mounted upon the peripheral flange of the stuffing box and supporting the bearing plate in spaced relation therefrom.

2. A gas meter of the dry type provided with a closed top, according to claim 1, in which the bearing plate is provided with brackets for the support of counter spindles of the meter mechanism.

3. A gas meter of the dry type provided with a closed top, comprising a valve plate and a closure plate for the gas-way above the valve plate, a crank spindle and tangent arm, the crank spindle extending through the closure plate and the crank being positioned between the valve plate and the closure plate, the closure plate being formed as an enclosure for the valve gratings and the valves and the crank of the crank spindle and with an inspection opening above the valves, a cover plate for closing the inspection opening of the closure plate, the said cover plate confining the valves upon the valve gratings, a stuffing box with peripheral flange seated upon the closure plate by means of the peripheral flange and serving for the passage of the crank spindle through the closure plate, a concentric enclosure encircling the stuffing box and of dimensions to leave to the exterior of the stuffing box an annular space, the said enclosure being carried by the crank spindle, packing material within the stuffing box and within the said annular space, and a bearing member for supporting the part of the crank spindle adjacent the tangent arm, the said bearing member being in spaced relation to and carried by the peripheral flange of the stuffing box.

E. W. SMITH.
ARTHUR CHARLES.
R. W. E. GASKIN.